US010930021B2

(12) United States Patent
Vallespi et al.

(10) Patent No.: US 10,930,021 B2
(45) Date of Patent: Feb. 23, 2021

(54) GUIDED GENERATION OF COLOR GRADIENTS VIA ADJUSTABLE COLOR MAP PATHS THROUGH COLOR SPACE ELEMENTS OF GRAPHICAL INTERFACES

(71) Applicant: Adobe Inc., San Jose, CA (US)

(72) Inventors: Jose Ignacio Echevarria Vallespi, San Jose, CA (US); Stephen Di Verdi, Oakland, CA (US); Hema Susmita Padala, Beaverton, OR (US); Bernard Kerr, Sausalito, CA (US); Dmitry Baranovskiy, Sydney (AU)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/407,717

(22) Filed: May 9, 2019

(65) Prior Publication Data

US 2020/0357146 A1 Nov. 12, 2020

(51) Int. Cl.
*G06T 11/00* (2006.01)
*G06F 3/0484* (2013.01)

(52) U.S. Cl.
CPC ........ *G06T 11/001* (2013.01); *G06F 3/04847* (2013.01); *G06T 2200/24* (2013.01)

(58) Field of Classification Search
CPC . G06T 11/001; G06T 11/203; G06T 2200/24; G06K 15/1878; G06F 3/04847
See application file for complete search history.

(56) References Cited

U.S. PATENT DOCUMENTS

| 10,002,571 B1* | 6/2018 | Zulch ................... G09G 3/3413 |
| 2008/0231637 A1* | 9/2008 | Motter .................. G06T 11/001 345/581 |
| 2010/0053198 A1* | 3/2010 | Vinkenvleugel .... G06F 3/04847 345/594 |

OTHER PUBLICATIONS

Viscm v0.7 (https://github.com/matplotlib/viscm/releases/tag/v0.7 released on Nov. 18, 2015) (Year: 2015).*
MPL Colormaps (https://bids.github.io/colormap/ published at least as of Jun. 13, 2015) (Year: 2015).*
(Continued)

*Primary Examiner* — William A Beutel
(74) *Attorney, Agent, or Firm* — Kilpatrick Townsend & Stockton LLP

(57) ABSTRACT

In some embodiments, a computing system generates a color gradient for data visualizations by displaying a color selection design interface. The computing system receives a user input identifying a start point of a color map path and an end point of a color map path. The computing system draws a color map path within the color space element between the start point and the end point constrained to traverse colors having uniform transitions between one or more of lightness, chroma, and hue. The computing system selects a color gradient having a first color corresponding to the start point of the color map path and a second color corresponding to the end point of the color map path, and additional colors corresponding to additional points along the color map path. The computing system generates a color map for visually representing a range of data values.

20 Claims, 10 Drawing Sheets
(7 of 10 Drawing Sheet(s) Filed in Color)

(56) References Cited

OTHER PUBLICATIONS

Smith et al. "A Better Default Colormap for Matplotlib | SciPy 2015 | Nathaniel Smith and Stéfan van der Walt", video time 19:08, published as of Jul. 8, 2015 at https://www.youtube.com/watch?time_continue=25&v=xAoljeRJ3IU&feature=emb_logo (Year: 2015).*
Scratchapixel 2.0 ("Bezier Curves and Surfaces: the Utah Teapot", published as of Feb. 12, 2016 at https://www.scratchapixel.com/lessons/advanced-rendering/bezier-curve-rendering-utah-teapot). (Year: 2016).*
Bujack, Roxana, et al., "The Good, the Bad, and the Ugly: A Theoretical Framework for the Assessment of Continuous Colormaps," IEEE Transactions on Visualization and Computer Graphics, vol. 24, No. 1, Jan. 2018, 11 pages.
Brewer, Cynthia, et al., "ColorBrewer: Color Advice for Maps", http://colorbrewer2.org/, Jul. 2006, accessed Jul. 18, 2019, 2 pages.
Pythong Software Foundation, "VISCM 0.8", https://pypi.org/project/viscm/, Mar. 19, 2019, accessed Jul. 18, 2019, 4 pages.
Github Inc. "mpl colormaps", https://bids.github.io/colormap/, accessed Jul. 18, 2019 13 pages.

\* cited by examiner

GUIDED GENERATION OF COLOR GRADIENTS VIA ADJUSTABLE COLOR MAP PATHS THROUGH COLOR SPACE ELEMENTS OF GRAPHICAL INTERFACES

TECHNICAL FIELD

This disclosure relates generally to controlling the display of interface elements on a display device via processing of interactive data based on inputs from one or more user device with respect to the display device. Specifically, the present disclosure relates to using guided drawing inputs through interface elements representing color spaces available at computing environments to obtain color gradients for use by visualization software.

BACKGROUND

Color selection is used for various software applications that generate graphical content. For instance, data visualization software is used to automatically create graphical representations of datasets, thereby allowing users to discern valuable insights from these datasets. In a simplified example, data visualization software can generate a set of colors used to respectively represent certain data segments or other data elements. For instance, the data visualization software could select red colors to indicate "negative" data and green colors to indicate "positive" data. One method of selecting colors for visualizations is computing a path, such as a straight line or Bezier curve, between two colors in a color space. A color space is an organization of colors based on a color model, such as a lightness-chroma-hue ("LCH") color model or a red-green-blue ("RGB") color model.

However, color for data visualization involves using color dimensions more precisely (e.g., variations in hue, saturation, etc.). Because the physical nature of color can be modelled with values and scales that do not match how the colors are perceived by the human eye, data visualizations often need to account for color perception when finding a set of colors that represents an underlying dataset. For instance, if a color map is used for representing a sequential data set with colors from a color gradient, a user may wish to have a color gradient in which the perceived changes in color across the color gradient accurately reflect the changes in the data values across the sequential dataset.

The goals identified above can be hindered by perceptual mismatch issues. Perceptual mismatch occurs if color choices do not accurately reflect the underlying data to be represented using the colors. For instance, the human eye is able to perceive linear variations in color in terms of lightness, hue, saturation, or some combination thereof. Although the human eye perceives colors using these lightness, hue, and saturation parameters, software uses light wavelengths to drive the colors to be outputted by displays. For example, software often models colors with an RGB system, in which three wavelengths (i.e., red, green, and blue) are used to reconstruct a whole gamut of colors. Variations in RGB values do not necessarily correspond to variation in how the human eye would perceive a color. For example, if two attribute values are represented by two colors with RGB values (r, g, b) and (2r, 2g, 2b), respectively, the second attribute value is not perceived as being twice as large as the first attribute value, even though the second color is obtained by doubling the RGB values of the first color. Furthermore, changes to RGB values affect the lightness, hue, and saturation. As a result, mapping RGB values directly to data values will introduce perceptual mismatches.

Existing color selection techniques, which involve software tools for drawing a path through a color space, present disadvantages with respect to reducing perceptual mismatch in color gradients obtained using these drawn paths. In one example, existing techniques are used to define color gradients with a "start" color and an "end" color, where the shape of the path and the color space control which colors fall between the start and end colors. The path shape could be a straight line (e.g., using linear interpolation) or curved (e.g., using Bezier paths). The same path will pass through different colors, depending on the color space. Giving a user direct access to all these combinations, in a software tool, leads to many color sets that include perceptual mismatches. Reducing the perceptual mismatches often requires users to perform remedial measures, such as manually add additional colors between the start and end colors, to review supporting visualizations for assessing whether a color set is perceptually suitable for data visualization, or some combination thereof. These remedial measures therefore lack intuitive interface features for efficiently selecting color sets that involve a sufficiently small amount of perceptual mismatch.

Therefore, existing techniques include disadvantages such as, but not limited to, those described above.

SUMMARY

Certain embodiments involve using interactive color map paths through interface elements representing color spaces available at computing environments to obtain color gradients usable for color maps in visualization software. For instance, a color-selection design interface could be coupled to an application for selecting colors for data visualizations. The color selection design interface displays a color space element that visually represents a color space available to a computing device or application, such as a color space that can be visually presented on a presentation device. The color-selection design interface is configured to receive a user input (such as a mouse click) identifying a start point of a color map path and an additional user input (such as a second mouse click) identifying the end point of a color map path. A color selection engine draws a color map path within the color space element of the color selection design interface between the start point and the end point of the color map path. The color selection engine constrains the color map path such that the color map path traverses representations of colors having perceptually uniform transitions between one or more of lightness, chroma, and hue. A uniform transition between one or more of lightness, chroma, and hue reduces a perceptual mismatch between colors and data, and improves the quality of the colors used for data visualizations. The color selection engine selects a color gradient having a first color corresponding to the start point of the color map path within the color space element. The color selection engine also selects a second color corresponding to the end point of the color map path within the color space element. In some cases, the color selection engine selects additional colors corresponding to additional points along the color map path within the color space element. The color selection engine selects the first point, the second point, and the additional points such that a color gradient including the first color, second color, and additional colors has uniform transitions between the one or more of lightness, chroma, and hue. The color selection engine generates a color map for visually representing a range of data values. In an embodiment, the color selection engine generates a color map that with the first color mapped to a minimum data value of the color gradient, the second color is mapped to maximum data value of the color gradient, and the additional colors are respectively mapped to additional values within the range of data values. The color selection engine may provide the color map to any number of data visualization applications.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

Figure 1:
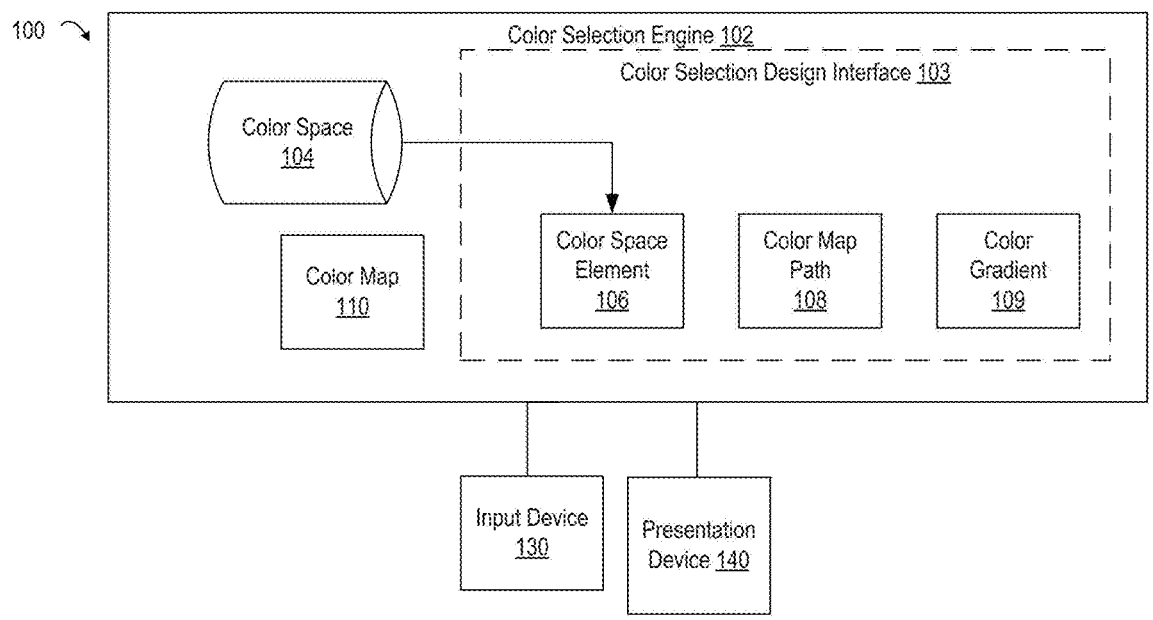
FIG. 1 depicts an example of a computing environment in which a color-selection design interface is used for obtaining a color gradient usable for generating a color map, according to certain embodiments of the present disclosure.

The patent or application file contains at least one drawing executed in color. Copies of this patent or patent application publication with color drawing(s) will be provided by the Office upon request and payment of the necessary fee.

DETAILED DESCRIPTION

Certain embodiments involve using interactive color map paths through interface elements representing color spaces available at computing environments to obtain color gradients or other sets of colors usable for color maps in visualization software. A color gradient or other set of colors includes a sequence of colors between two colors in a color space, and a color map associates the sequence of colors with a dataset or a normalized version of the dataset. As discussed above, existing solutions can be ineffective at reducing color-based perceptual mismatch in data visualizations. Certain embodiments described herein can be used to generate color maps that are perceptually linear (e.g., accurately represent a dataset) and perceptually uniform (e.g., maintain perceptual properties in any region of the color space).

The following non-limiting example is provided to introduce certain embodiments. In this example, a color-selection engine executed by a computing system displays a color-selection design interface. The color-selection design interface includes a color space element that visually represents a color space accessible to the computing system. In an example in which the lightness-chroma-hue ("LCH") color space is used to select colors for data visualization, the color space element displays a two-dimensional ("2D") projection of that LCH color space that is available to the computing system. For instance, the color-selection engine identifies a desired lightness value within the LCH color space that has been specified via a user input, and presents a 2D color wheel of the LCH color space (a CH slice) at the selected lightness value.

Continuing with this example, the color-selection engine draws, responsive to one or more user inputs, a color map path within the color space element. The color map path could be, for instance, a curvilinear path between two points (e.g., user-specified start and end points and end point) on the color space element. The color-selection engine generates a color gradient from different samples (e.g., LCH values) uniformly distributed along the color map path. For instance, the color-selection engine selects a first color corresponding to the start point of the color map path within the color space element, a second color corresponding to the end point of the color map path within the color space element, and additional colors corresponding to intervening points along the color map path within the color space element. In one example, the color-selection engine selects four colors equally distributed along the color map path to represent data values within four distinct subsets of a dataset.

For example, even though numerous paths exist between a given pair of start and end points, the color-selection engine guides the drawing of the color map path such that the color map path traverses color representations (e.g., sections of the color space element) corresponding to colors that uniformly transition between one or more LCH values. Because the color-map path has been constrained, the selected color gradient includes colors with uniform transitions between LCH values. These uniform transitions between LCH values reduce perceptual mismatches when the color gradient is mapped to range of data values via a color map.

A color gradient generated by the color-selection engine is used by suitable software (e.g., the color-selection engine or another tool) to create a color map. The software maps the first color to a first end of the range of data values, maps the second color to a second end of the range of data values, and maps the additional colors respectively to additional values within the range of data values. In one example, the software maps the color gradient to a data set [0, 1], where the first color is mapped to 0, the second color is mapped to 1, and other colors are mapped to values between 0 and 1. A color map using a data range [0, 1] can be used for multiple different data sets, since the range of values in any given dataset can be normalized to the normalized data range of 0 to 1. The color map is used by a computing device or application to perform one or more visualization operations.

As used herein, the term "color space element" is used to refer to an electronically rendered, visual representation of a set of colors within a graphical user interface. A color space element can visually represent one or more portions of a color space.

As used herein, the term "color map path" is used to refer to a set of related points within a color space element that collectively define one or more line segments, one or more curves, or some combination thereof. A color space element can visually represent one or more portions of a color space.

As used herein, the term "color gradient" is used to refer to a set of color values obtained using a color map path.

As used herein, the term "color map" is used to refer to a data structure that includes sets of color values, data set values, and associations that map particular sets of color values to particular data set values (e.g., a set of values [0,1] from 0 to 1). In some embodiments, these associations are a one-to-one mapping between sets of color values and a range of data values that has been normalized to fall with [0,1].

Certain embodiments provide improvements to computing systems used for creating interactive content or other graphical content that visually represents one or more datasets. For instance, as described herein, existing techniques often entail cumbersome or time-consuming processes for generating color maps in which perceptual mismatch has been reduced or eliminated. These problems can be addressed by various interface features described herein. For instance, a color-selection design interface can have a structure including a color space element and one or more interactive elements for drawing a color map path through the color space element. In some embodiments, the color space element can visually represent a portion of a color space that is available to a target computing environment (e.g., a computing environment including one or more of a particular display device configured to display certain colors, a particular graphics processor configured to render certain colors, a particular software application programmed to display or use certain colors, etc.). The functionality paired with this structure, such as controlling how the color map path is drawn and mapping points along the color map path to certain color values and data values (or groups of data values), allows for generating color maps with reduced perceptual mismatch in data visualizations more intuitively and efficiently than existing solutions. Thus, the structure and associated functionality of the interface features described herein can provide improvements to the data visualization software.

Referring now to the drawings, FIG. 1 depicts an example of a computing environment in which a color-selection design interface provided by a color-selection engine is used to select a color gradient usable for generating a color map, according to certain embodiments of the present disclosure. In various embodiments, the computing environment 100 includes a color-selection engine 102 executed by one or more computing devices.

The color-selection engine 102 is a software application that provides a color-selection design interface 103 for generating a color gradient 109 that can be used for generating a color map 110. The color-selection engine 102 includes one or more sets of program code that can control the operation of a display device (e.g., by rendering one or more interfaces on the display device). Examples of this program code include program code for rendering content for display, program code for creating one or more instances of event listeners or other suitable objects for receiving input from input devices (e.g., a mouse, a touchscreen, etc.), program code for modifying the appearance of interface elements based on input received from input devices (e.g., moving a cursor, changing the colors of certain pixels displayed on the screen, etc.). The color-selection design interface 103 includes one or more movable interface elements (e.g., text fields, sliders, drawing tools, etc.) and one or more instances of event listeners or other programming objects for receiving input with respect to these interface elements. The color-selection engine 102 also includes one or more sets of program code that can generate control data for software applications used to create data visualizations. For instance, the color-selection engine 102 can include program code for generating one or more data structures that associate certain color values with certain values of dataset. In some embodiments, the color-selection engine 102 is included within a software application that generates data visualizations from datasets. In additional or alternative embodiments, the color-selection engine 102 is separate from and can be communicatively connected to a software application that generates data visualizations from datasets.

The computing environment 100 can also include storage components for various data sets. These storage components can be local to the computing device that executes the color-selection engine 102 (e.g., accessible via a data bus), can be remotely located and accessible via a network connection, or some combination thereof. A storage component can include any suitable non-transitory computer-readable medium described herein.

In this example, the color-selection design interface 103 displays a color space element 106 on presentation device 140. A color space element 106 can include both graphical data specifying the visual appearance of the color space element 106 and one or more instance of program code that can detect and/or respond to user inputs with respect to the color space element 106 (e.g., program code that listens for events with respect to the color space element 106, program code that updates one or more pixels used to render the color space element 106 on a display device based on user inputs, etc.). One example of the color space element 106 is a visual representation of a color space 104, such as a color wheel of the LCH (Lightness, Chroma, Hue) color space. Other visual representations and color spaces (e.g., CIECAM) may also be represented by a color space element 106. The color-selection design interface 103 may also contain additional visual elements. Examples of these additional visual elements include as a spectrum ring, a lightness selector, various color position indicators, a sequential/divergent path selector, and other selectable elements discussed with regard to FIG. 3.

In some embodiments, using a color wheel or other interface features described herein allows for exposing a color space to a user for exploration. For instance, color spaces that model lightness, saturation and hue are "shaped" like a cylinder, with lightness on the vertical axis and hue as the rotation angle. This is effectively a polar coordinate system, which means that at least two paths (a shortest path and longest path) exist from one hue to another hue. Both a shortest path and a longest path may be sufficient for data visualization purposes. Interface features described herein allow the user to understand the colors on each region to decide accordingly. For instance, by using a color wheel graphical representation, linear paths in LCH turn into intuitive and self-explanatory curves, thereby achieving guided authoring by allowing the user to select any two colors for the gradient (a third one for divergent color maps, discussed below), while the rest of the path is generated automatically. In this manner, various criteria for obtaining a suitable color map for data visualization are met.

The color-selection engine 102 can be configured, via inputs to the color-selection design interface 103, to generate color data for visually representing different datasets. For instance, the color-selection engine 102 can generate, responsive to one or more inputs received via the color-selection design interface 103, a color map path 108 within a color space element 106. A color map path 108 can be programmatically implemented using a data structure that associates certain points in the color-selection design interface 103 (e.g., pixels used to depict the color map path 108) with corresponding display data for rendering the color map path 108 (e.g., specifying that pixels used to display the color map path should be changed from a color value in the color space element 106 to a black color).

An example of the color map path 108 is a straight line or curvilinear line from a start point to an end point that passes through various colors represented by portions of the color space element 106. In one example, the color-selection engine 102 assigns a first color and a second color within the color space 104 to a start point and an end point of the color map path 108, respectively. The color-selection design interface 103 can be used to modify the start point, the end point, or curve radius responsive to requests from input device 130. The color-selection engine 102 updates the color space element 106 in the color-selection design interface 103 with each adjusted position of the start point, end point, or of the curve radius of color map path 108.

In an embodiment, the color-selection engine 102 computes the color map path 108 by linear interpolation between the start point and the end point. The color-selection engine 102 performs linear interpolation to ensure that a color map 110 generated from the color map path 108 is perceptually linear with respect to the colors represented by the color space element 106 that is intersected by the color map path 108. The color map path 108 can include any length, so long as the color map path 108 remains within the color space element 106. In some embodiments, the color map path 108 can result in a spiral inside the color wheel, an example of which is described herein with reference to FIG. 4.

The color-selection engine 102 can determine the length of the color map path 108 based on the position of the start point and end point, including any adjustments in the start point or end point positions that are performed based on requests from an input device 130. Examples of an input device 130 include a computer mouse, a touchpad, a voice command receiver, a gaze point receiver, etc. The color-selection engine 102 generates the color map path 108 to represent a sequential gradient or divergent gradient that are discussed in greater detail with reference to FIGS. 4-7. The color-selection engine 102 computes the color map path 108 to represent the various colors to be included in a color gradient 109 from which a color map 110 can be generated. The individual components of the color-selection design interface 103 are discussed further in reference to FIG. 3.

The color-selection engine 102 generates a color gradient 109 from the color map path 108. For instance, the color-selection engine 102 can build a color gradient 109 by storing sets of color values that define a set of colors, where the set of colors corresponds to portions of the color space element 106 intersected by the color map path 108. As a simplified example, the color gradient 109 could include at least three colors defined by three different sets of LCH values.

The color gradient 109 can be used to generate a color map 110. A color map 110 is a data structure that includes sets of color values, data set values, and associations that map particular sets of color values to particular data set values. The color-selection engine 102 or another suitable software tool updates or generates the color map 110 by adding mapping between the set of colors in the color gradient 109 and a data set accessed by computing environment 100. For example, the color-selection engine 102 can generate a color map 110 for a data set used by an analytics program. The color-selection engine 102 or other suitable software tool may be included in the analytics program, or be communicatively coupled to a data source that stores the data set used by an analytics program. The color-selection engine 102 or other suitable software tool can receive one or more user inputs identifying the location of the data set for which the color map 110 is to be generated.

In one example, a color gradient 109 having various different sets of LCH values can be mapped to a data set from 0 to 1. The "0" value in the data set can be mapped to a first color (e.g., a first set of LCH values) corresponding to a start point along a color map path 108 through a color space element 106. The "1" value in the data set can be mapped to a second color (e.g., a second set of LCH values) corresponding to an end point. Additional values in the data set between 0 and 1 can be mapped to intermediate points along the color map path 108 representing other color (e.g., other sets of LCH values).

In some embodiments, a color map 110 that maps color gradients 109 to a normalized data range (e.g., a range of 0 to 1), can be used for the visualization of various datasets with different data ranges. For instance, a dataset with values in the range [25, 50] can be converted into a normalized dataset with values in the normalized data range [0,1], and thereby utilize the color map 110 that maps a particular color gradient 109 to [0,1]. This example is provided for illustrative purposes only. In various embodiments, different color spaces, differently sized datasets, and different mapping schemes (e.g., highest dataset value mapped to start point) could be used.

The color-selection engine 102 or other suitable software tool outputs the color map 110. For instance, the color-selection engine 102 provides the color map 110 to a user via presentation device 140, thereby allowing a user to manually refine or otherwise modify one or more characteristics of the mapping. Additionally or alternatively, color-selection engine 102 provides to various software applications, such as a program utilizing color visualizations of datasets, or computing systems, such as client devices executing these software applications.

In one example, the color-selection engine 102 presents, within color-selection engine 102, colors of a color gradient 109 or a color map 110 on a presentation device 140 prior to the color gradient 109 being used to generate a color map or the color map 110 being used for data visualization. The color-selection engine 102 modifies the color gradient 109, the color map 110, or both based on user interactions via input device 130, which can be used to manipulate the visualization of the data intuitively and iteratively. For instance, the color-selection engine 102 generates the color gradient 109 based on a first position of the start point and a first position of the end point of color map path 108. Responsive to receiving an adjustment to either the start point or the end point of the color map path 108, the color-selection engine 102 updates the appropriate start or end point position, computes an updated color map path 108, and updates the display of color space element 106 accordingly. The color-selection engine 102 can perform any number of updates based on additional interactions by a user via input device 130 requesting further edits of the color map path 108.

Figure 2:
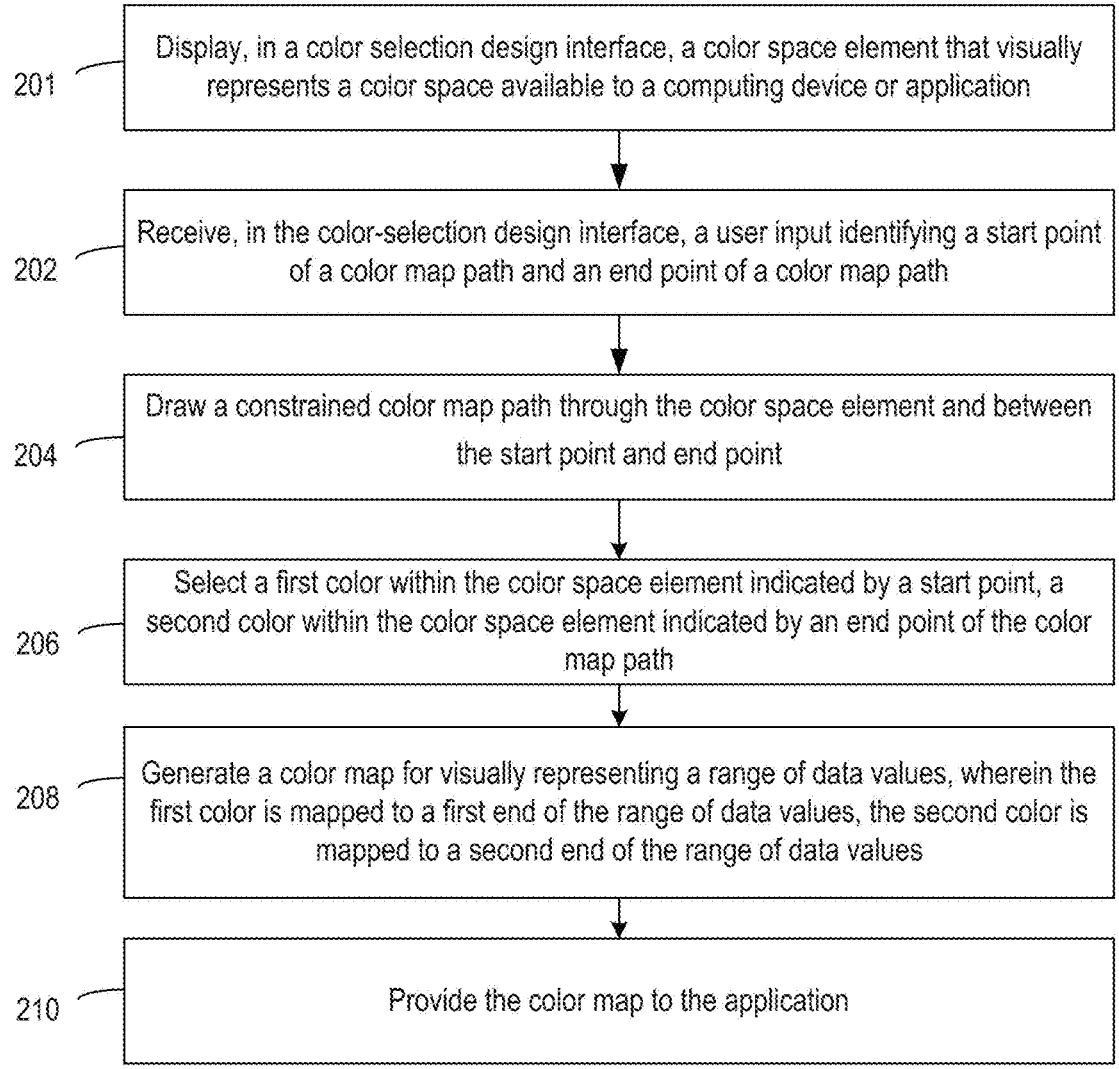
FIG. 2 depicts an example of a process for generating a color gradient for a color map that is used to visually represent a range of data values, according to certain embodiments of the present disclosure.

FIG. 2 depicts an example of a process 200 for generating a color range usable for generating a color map that can visually represent a range of data values, according to certain embodiments of the present disclosure. One or more computing devices execute suitable program code (e.g., the color-selection engine 102, the color-selection design interface 103, etc.) implement operations depicted by FIG. 2. For illustrative purposes, the process 200 is described with reference to certain examples depicted in the figures. Other implementations, however, are possible.

At block 201, the process 200 involves displaying, in a color-selection design interface 103, a color space element 106 that visually represents a color space available to a computing device or application. For instance, the color-selection engine 102 generates or updates the color-selection design interface 103 described above with respect to FIG. 1. The color-selection engine 102 configures or otherwise causes the presentation device 140 to display a color space element 106 within the color-selection design interface 103. The color space element 106 visually represents a color space 104 available to computing environment 100. An example of a color space element 106 is a visual representation of a portion of a color space. For instance, if an LCH color space is used, the color space element 106 could be a circular element representing a 2D CH slice within the LCH color space at a particular lightness value.

Returning to FIG. 2 at block 202, the process 200 involves receiving, in the color-selection design interface, a user input identifying a start point of a color map path and an end point of a color map path. For instance, the color-selection design interface receives input from an input device 130, such as a computer mouse. The color selection design interface receives input (such as a mouse click) at a location (represented by a mouse icon on a presentation device 140) that corresponds to the start point of a color map path. The color-selection design interface receives an additional input (such as a second mouse click) at a location (represented by a mouse icon on a presentation device 140) that corresponds to the end point of a color map path.

At block 204, the process 200 involves drawing a constrained color map path through the color space element and between the start point and end point. For example, even though numerous paths exist between a given pair of start and end points, the color-selection engine 102 restricts the drawing of a path between the points to a path that would identify a color gradient having uniform transitions between one or more of lightness, chroma, and hue (e.g., a color gradient that uniformly increases LCH values). Thus, the color map path as drawn on the color-selection design interface would traverse color representations (e.g., sections of the color space element) corresponding to colors that uniformly transition between one or more LCH value.

Figure 3:
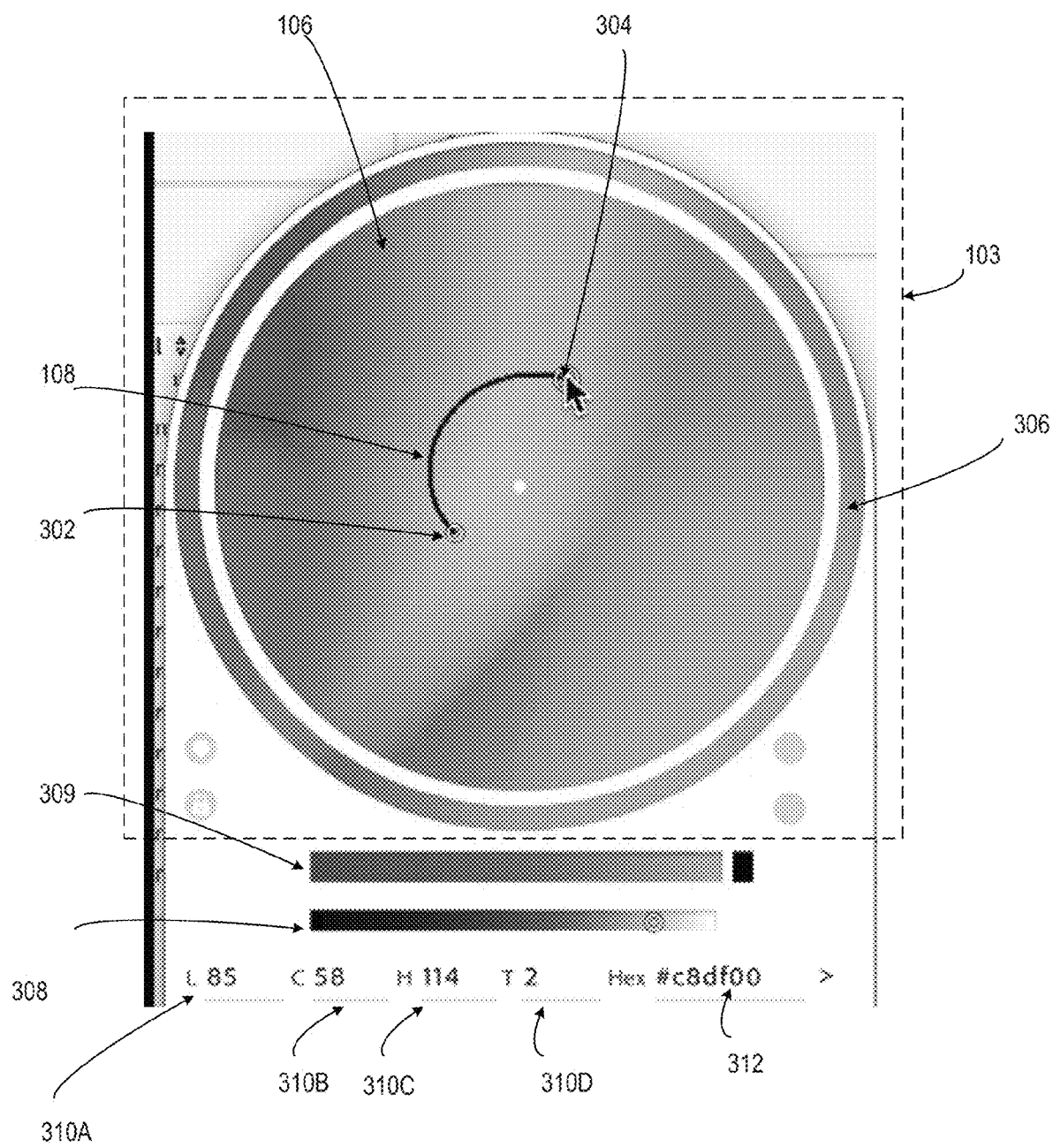
FIG. 3 depicts an example of a color map path through a color space element in a color-selection design interface, according to certain embodiments of the present disclosure.

FIG. 3 depicts an example of generating a curved color path through a color space element in a color-selection design interface. The color space element 106 visually represents color space 104, such as the LCH color wheel characterized by a particular lightness (i.e., an "L" value 310A or the L slider control 308). The color wheel used as the color space element 106 represents, in the example of FIG. 3, a 2D CH slice having the portion of the cylindrical LCH color space at the particular lightness value.

The color-selection design interface 103 depicted in FIG. 3 also includes a lightness control indicator 310A (or slider control 308) for adjusting the color space element 106. For instance, an input received via the color-selection design interface 103 could adjust the lightness value (i.e., an input adjusting the lightness selector 308) used to generate the color space element 106. The lightness control indicator 310 (or slider control 308) can receive inputs and adjust the lightness value of L. The color space element 106 can be updated to depict a different LCH color wheel corresponding to the adjusted lightness value. The interface elements, such as those depicted in FIG. 3 as well as other examples described herein, can be implemented using suitable display data (e.g., data indicating the shape and location of the element) and corresponding program code (e.g., program code that listens for user input with respect to the element and modifies the appearance of one or more elements of the interface).

In an embodiment, the color-selection design interface 103 draws a first point of the color map path 108 based on a first indication from input device 130 and draws a second point of the color map path 108 based on a second indication from input device 130. The color-selection design interface 103 draws additional points of color map path 108 responsive to additional indications from input device 130. For example, the color-selection design interface 103 receives inputs from an input device 130 within color space element 106. The inputs indicate a first location and a second location within color space element 106. The color-selection engine 102 computes and the color-selection design interface 103 draws a linear or curvilinear line from the first location within color space element 106 to the second location within color space element 106. The linear or curvilinear line can be the color map path 108.

For instance, in FIG. 3, the first location indicated by a user input is illustrated as start point 302, and the second location indicated by a user input is illustrated as end point 304. The color-selection engine 102 draws the color map path 108 from start point 302 to end point 304. (FIG. 3 depicts the inputs from input device 130 using a mouse arrow cursor icon, but other interface elements can be used.) The color-selection engine 102 draws the color map path 108 as the user inputs from the input device 130 move from the start point 302 to the end point 304. The color-selection engine 102 updates the end point 304 based on additional indications from input device 130 and updates the color map path 108 accordingly. In the example of FIG. 3, the constraints on the drawing of a color map path 108 as described above with respect to block 204 of FIG. 2 are implemented by enforcing a curvilinear path where the LCH change is linear and uniform along the color map path 108.

Returning to FIG. 2, at block 206, the process 200 involves selecting, from the color space, a color gradient having different colors corresponding to points of the color map path within the color space element. For instance, the color-selection engine 102 can select a first color corresponding to a start point 302 of the color map path within the color space element, a second color corresponding to an end point 304 of the color map path within the color space element, and additional colors corresponding to additional points along the color map path within the color space element. The color-selection engine 102 selects a first color, a second color, and additional colors along the color map path 108. Color-selection engine 102 may select any quantity of colors between the start point 302 and the end point 304 of the color map path 108. The color map path can be used to obtain a color gradient.

In the example of FIG. 3, color-selection engine 102 selects a first color determined by the color space coordinates corresponding to start point 302. In this example, the color-selection engine 102 determines that start point 302 corresponds to coordinates in the LCH space of (85,43,322). For instance, the start point 302 is positioned at a location defined by a hue rotation angle, a chroma distance from the center within the color space element 106 that represent certain CH values, and the value of the lightness selector 308 provides the L value. The color-selection engine 102 assigns the color at the start point 302 (85,43,322) as the first color. The color-selection engine 102 selects a second color determined by the color space coordinates of the end point 304. The color-selection engine 102 determines that the end point 304 corresponds to coordinates in the LCH space of 304 (85, 58, 114). The color-selection engine 102 assigns the color (85, 58, 114) as the second color.

The color-selection design interface 103 also includes a spectrum ring 306. The spectrum ring 306 visually represents the available hues at a computing device. For instance, the spectrum ring 306 is a fully saturated representation of each available hue. In another example, the spectrum ring 306 can be a non-fully saturated representation of each available hue.

The color-selection engine 102 may select additional colors along the color map path 108 between the start point 302 and the end point 304. The color-selection engine 102 assigns the additional selected colors to different positions between the first and second color. In some aspects, the color-selection engine 102 selects the additional colors in accordance with particular intervals or spacing along the color map path 108. For instance, if the color-selection engine 102 identifies two points along the color map path 108 that are evenly spaced between the color map path 108, and selects two additional colors corresponding to these two points, respectively. For the selected color location 304, the color-selection engine 102 assigns color control indicators 310A, 310B, 310C to the values of a selected color. The color control indicator 310A represents the lightness value of the selected color. The color control indicator 310B represents the chroma value of the selected color. The color control indicator 310C represents the hue value of the selected color. The interface indicates 310D T=2 where T represents the number assigned to selected color point on the color wheel. In 106 there are two color points T=1 corresponds to the start point 302 and T=2 is at the end point 304. In some embodiments, the color control indicators 310A, 310B, and 310C may also receive input for a color value (e.g., a keyboard) and the color-selection engine 102 adjust the colors start point 302 or end point 304.

The color-selection engine 102 also includes a color conversion indicator 312 within the color-selection design interface 103. In this example, the color conversion indicator 312 is a field for displaying a hexadecimal value that represents the selected color (i.e., the hexadecimal representation of the selected color as opposed to its LCH values).

In some embodiments, the color-selection engine 102 or other suitable software uses the color gradient 109 to generate a color map. For instance, returning to FIG. 2, at block 208, the process 200 involves generating a color map for visually representing a range of data values. The color-selection engine 102 or other suitable software generates a color map 110 by mapping the selected colors in a color gradient 109 to a range of data values. The color-selection engine 102 maps the first color to a first end of a color gradient that will contain the range of data values. The color-selection engine 102 maps the second color to a second end of the range of data values. The color-selection engine 102 maps the additional selected colors to additional values between the first end of the range of data values and the second end of the range of data values.

In some embodiments, a set of target data values that is visually represented using the color map is different from the range of data values included in the color map. For instance, the range of data values included in the color map could be a normalized range (e.g., from a minimum data value of 0 to and a maximum data value of 1). To visually represent the target data values with the color map, a minimum target value is normalized to the maximum data value in the normalized range and represented with the first color. Similarly, a maximum target value is normalized to the maximum data value in the normalized range and represented with the second color. Furthermore, other target data values are normalized to intermediate values from the normalized range and represented with the additional selected colors.

In a simplified example with a data set of [1, 3, 5, 7], the data set is normalized to [0,1]. The color-selection engine 102 is used to obtain a color gradient for mapping first and second colors to the first and second ends of the normalized data range (e.g., first color to "0" and second color to "1"). The color-selection engine 102 can map other color values to normalized dataset values between 0 and 1. The color gradient mapped to the normalized data set is usable for representing the data set of [1, 3, 5, 7] with appropriate colors for each data value along the color map path 108 to the data values [1,3,5,7]. In another example, a data color scale may be set in relation to the data set [1,3,5,7] to have a minimum of 0 and maximum of 10. In this example, the data set is normalized to [0,1] with the data values [0,1,3, 5,7,10]. For instance, the colors indicated by a color map path in the color selection design interface are mapped to data via a color scale, with a first color mapped to the minimum value of the scale and a second color mapped to the maximum value of the scale. The color-selection engine 102 maps data values to color values corresponding to points along the color map path.

At block 210, the process 200 involves outputting the color map. One or more computing devices can execute suitable program code to implement block 210. In some embodiments, outputting the color map involves causing the color map 110 to be visually represented in the color-selection design interface 103 for further adjustments. The color-selection engine 102 can instruct a presentation device 140 to render a color gradient element 309 for display. The color-selection engine 102 can also instruct the presentation device 140 to adjust one or more visual properties of the color gradient element 309 based on subsequent changes to the lightness selector 308, the position of the start point 302 or end point 304, etc. In additional or alternative embodiments, outputting the color map 110 involves causing the color map 110 to be provided to certain software applications, computing devices, or both. For instance, the color-selection engine 102 can transmit the color map 110 to a computing device executing an analytics application, store the color map 110 in a data structure used by the analytics application to control visualization of datasets, update a configuration file used by the analytics application to control visualization of datasets, etc.

Figure 4:
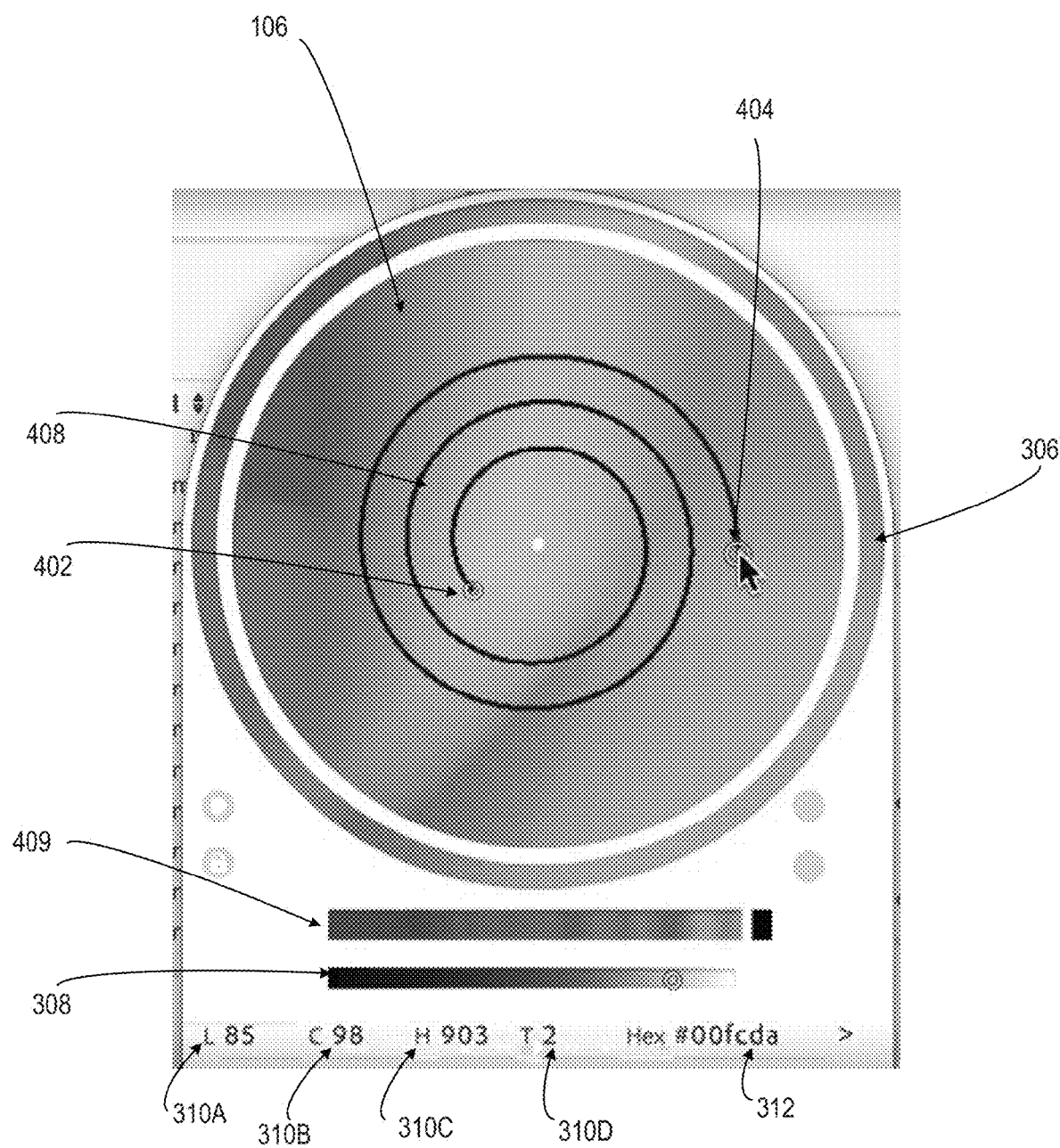
FIG. 4 depicts an example of generating a spiral-shaped color map path through a color space element in the color-selection design interface of FIG. 3, according to certain embodiments of the present disclosure.

FIG. 4 depicts an example of generating a spiral-shaped color path through a color space element in the color-selection design interface of FIG. 3, according to certain embodiments of the present disclosure. In this example, the color-selection engine 102 has generated a color map path 408 between start point 402 and end point 404 via one or more operations described above with regard to FIGS. 1 and 2. The color-selection design interface 103 displays the color map path 408 between the start point 402 and end point 404 in color space element 106. The color-selection engine 102 computes a gradient corresponding to the color map path 408. The color-selection design interface 103 displays color gradient element 409 to represent a color gradient that is generated based on the color map path 408. In this example, the color map path 408 allows multiple loops around the color wheel. If a point is moved, the color-selection engine 102 computes the color map path 408 such that the position of the active point 404 is edited relative to its previous position, in a differential way. The color-selection engine 102 thus enables the color map path 408 to extend through any number of degrees of hue. In some embodiments, using this differential approach to generating H values in the color-selection engine accounts for hue values H that cross the 360° or 0° thresholds generates numbers greater than 360° or less than 0°. In these cases, the color-selection engine 120 recalculates the hue value H by subtracting 360° or adding 360° respectively.

Figure 5:
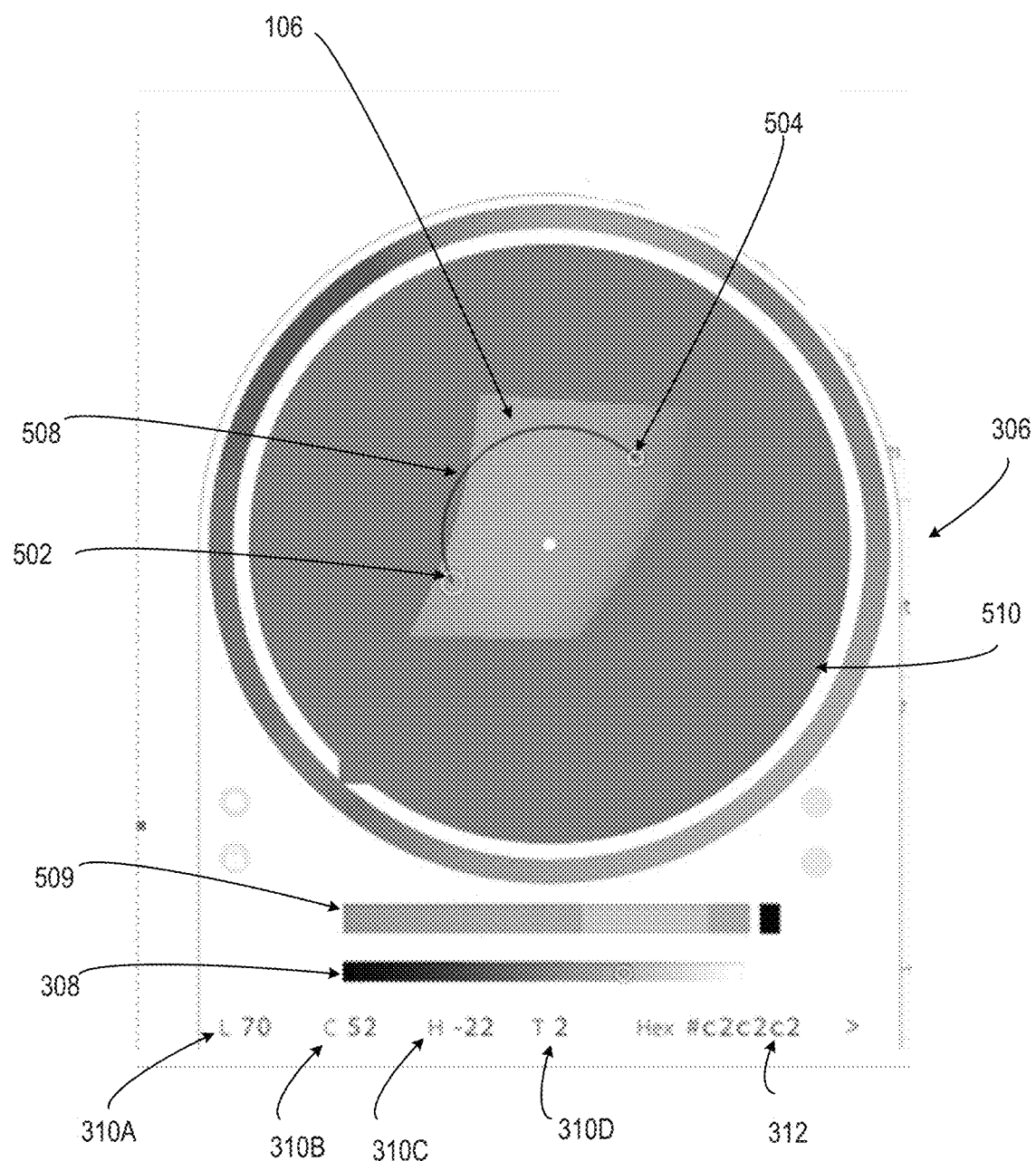
FIG. 5 depicts an example of using a gamut mask element to visually indicate constrains on available colors in the color-selection design interface of FIG. 3, according to certain embodiments of the present disclosure.

FIG. 5 depicts an example of using a gamut mask element to visually indicate colors that a presentation device 104 (e.g. monitor, other display device or printer) cannot produce in the color-selection design interface of FIG. 3, according to certain embodiments of the present disclosure. For instance, due to physical limitations in certain presentation devices, FIG. 3 shows a full color wheel by repeating colors to fill the entire circle from the edge of the gamut mask to the spectrum ring in FIG. 5 (e.g., FIG. 5 depicts an example of a display that is physically limited from displaying all the colors in the color wheel of FIG. 3). In FIG. 5, the color-selection engine 102 has generated a color map path 508 between start point 502 and end point 504 as described with regard to FIGS. 1 and 2. In the example of FIG. 5, the constraints on the drawing of a color map path 108, as described above with respect to block 204 of FIG. 2, are implemented by enforcing a curvilinear path in which the LCH change is linear and uniform along the color map path 508. The color-selection design interface 103 displays the color map path 508 between the start point 502 and end point 504 in color space element 106. The color-selection engine 102 computes a color map along the color map path 508. The color-selection design interface 103 displays color gradient element 509 to represent the color map that is generated based on the color map path 408. As illustrated in FIG. 5, the color map path 508 extends into the gamut mask element 510 representing one or more colors that are unable to be displayed due to technical limitations of the presentation device 140. The color selection design interface 103 displays a portion of the color gradient element 509 (that corresponds to a portion of the color map path 508 in the gamut mask element 510) as the color of the gamut mask element 510.

In an embodiment, the color-selection design interface 103 includes a gamut mask element 510. An example of a gamut mask is represented by gamut mask element 510 and provides a limitation on the available colors (i.e., hues and chroma for a particular lightness) for selection as the start point 502 and the end point 504. The gamut mask element 510 limits the colors shown by masking colors that do not have the specified hue and chroma values for a given lightness, or are not available, due to limitations of the presentation device 140, within the color space (e.g., variation in colors are available in LCH, LAB). As illustrated in FIG. 5, the gamut mask element 510 masks colors that are not available in the LCH color space (the grayed portion that obscures colors) at the specified hue and chroma values. The color-selection engine 102 computes the gamut mask element 510 based on the available colors in the color space 104 (i.e., LCH color space in FIG. 5) and the lightness selector 308. The color-selection design interface 103 displays the gamut mask element 510 based on updated available colors from the color-selection engine 102. The color-selection engine 102 updates the gamut mask element 510 to show the available colors to the color map path for a given lightness value. Because of physical limitations of displays, it is not currently possible to render the whole range of LCH values. Instead, colors beyond the limited red-green-blue ("RGB") gamut of the display (grey region in FIG. 5) are physically mapped to the closest color inside the gamut. The presentation device 140 may still impart some error even when the LCH color map path is correct. Accordingly, the presentation device 140 may present some colors improperly displayed because of technical limitations leading to potential perceptual mismatches in data visualization. The color-selection engine 102 may apply the mask color to identify these technical limitations of the display in the color-selection design interface 103.

For example, the color-selection engine 102 may update the gamut mask element 510 by adjusting one or more edges or corners of the gamut mask element 510. The presentation of the gamut mask element 510 within the color-selection design interface 103 provides an intuitive control interface using any color space 104 available. The color-selection engine 102 computes the gamut mask element 510 by determining a subset of hue and chroma values in a specified color space (e.g., LCH, LAB, etc.) at the input lightness value.

Figure 6:
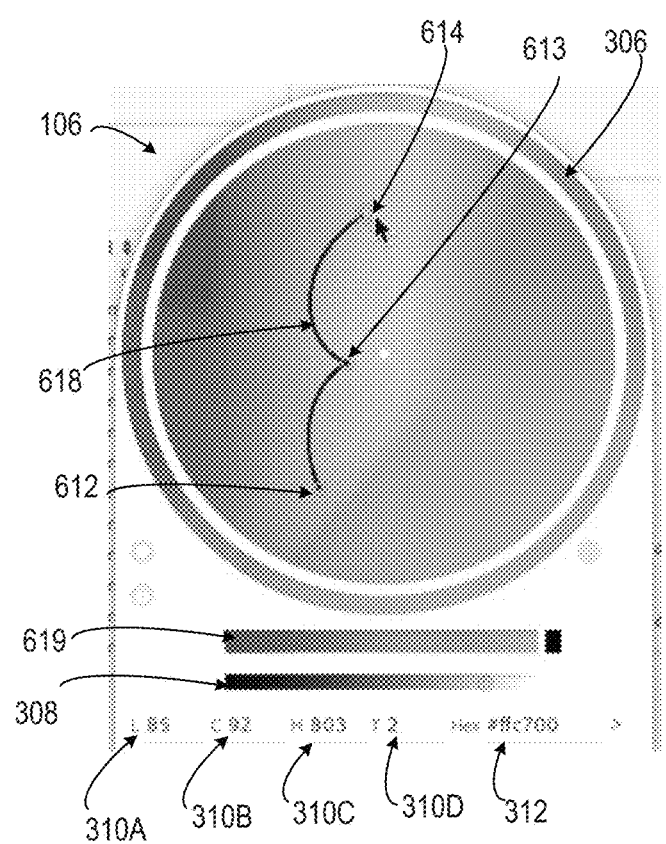
FIG. 6 depicts an example of generating a divergent color map path through a color space element in the color-selection design interface of FIG. 3, according to certain embodiments of the present disclosure.

FIG. 6 depicts another example of generating a divergent color map path through a color space element in the color-selection design interface of FIG. 3, according to certain embodiments of the present disclosure. The color-selection engine 102 has generated a color map path 618 between start point 612 and end point 614 as described with regard to FIGS. 1 and 2. The color-selection design interface 103 displays the color map path 618 between the start point 612 and end point 614 in color space element 106. The color-selection engine 102 computes a color gradient from the color map path 618. The color-selection design interface 103 displays color gradient element 619 to represent the color gradient that is generated based on the color map path 618.

In this example, the color-selection design interface 103 receives an input of divergent for the sequential-divergent value. For a divergent color map, the color-selection engine 102 computes a path from the start point 612 to the end point 614 that includes an additional point 613 at a neutral color position. The color-selection engine 102 computes the color map path 618 as a curved line from the start point 612 to the additional point 613, and a curved line from the additional point 613 to the end point 614. The color-selection design interface 103 displays the color gradient element 619, which illustrates a divergent color gradient in this example. In the example of FIG. 6, the constraints on the drawing of a color map path 618 as described above with respect to block 204 of FIG. 2 are implemented by enforcing a curvilinear path where the LCH change is linear and uniform along the color map path 618. In other examples, the color-selection engine 102 computes a path from the start point 612 to the end point 614 that includes an additional point at a neutral color position that has a different lightness value than the start point 612 or the end point 614.

Figure 7:
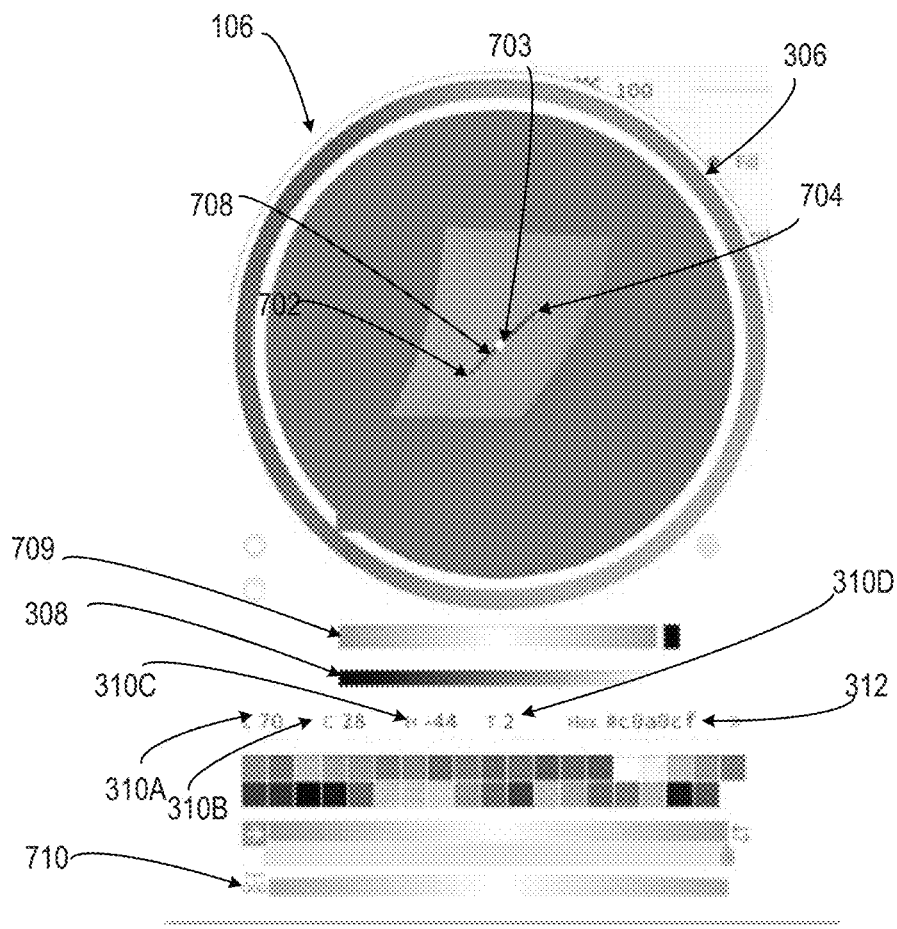
FIG. 7 depicts another example of generating a divergent color map path through a color space element in the color-selection design interface of FIG. 3, according to certain embodiments of the present disclosure.

FIG. 7 depicts an example of generating a divergent color map path through a color space element in the color-selection design interface of FIG. 3, according to certain embodiments of the present disclosure. The color-selection engine 102 has generated a color map path 708 between start point 702, middle point 703 and end point 704 as described with regard to FIGS. 1 and 2. The color-selection design interface 103 displays the color map path 708 between the start point 702 and end point 704 in color space element 106. The color-selection engine 102 computes a color gradient from the color map path 708. The color-selection design interface 103 displays color gradient element 709 to represent the color gradient that is generated based on the color map path 708.

In this example, the color-selection design interface 103 receives an input for the sequential-divergent value of divergent. The color-selection engine 102 computes the color map path differently based on the input of the sequential-divergent selector. For instance, a sequential color map path proceeds directly (i.e., sequentially in terms of colors) from the start point to the end point of the color map path (e.g., resulting in a color gradient with a sequential color gradient from the first color to the last color). In contrast, a divergent color map path proceeds from the start point to a neutral point, and from the neutral point to the end point (e.g., resulting in a color gradient with two "poles" at each end). For a divergent color map path, the color-selection engine 102 computes a path from the start point 702 to the end point 704 that includes an additional point 703 at a neutral color position. The color-selection engine 102 determines that the additional point 703 is within a threshold distance from the center of the color space element 106. In some embodiments, a color-selection design interface 103 can receive inputs for additional points of the color map path (e.g., 4, 5, 6, etc.). The color-selection engine 102 utilizes the threshold distance to determine when the color map path provides a more intuitive path by varying chroma (i.e., straight line color map path) or by varying both chroma and hue (i.e., a curved color map path). An example of the threshold is 2 units according to the CIEDE2000 color difference metric between the center of the wheel for the current L=(L, 0, 0) and the position of the additional point 703. The color selection engine 102 can use various threshold values lower or higher than 2 to switch between straight and curvilinear paths when the additional point 703 is closer or further from the center of the color wheel.

The color-selection engine 102 can compute the color map path 708 as a straight line from the start point 702 to the additional point 703, and a straight line from the additional point 703 to the end point 704. The color-selection design interface 103 displays the color gradient element 709, which illustrates a divergent color gradient in this example. The color selection design interface 103 displays lightness graph 710 that illustrates the various lightness along the color gradient element 709. The lightness graph 710 illustrates a divergent lightness graph.

Figure 8:
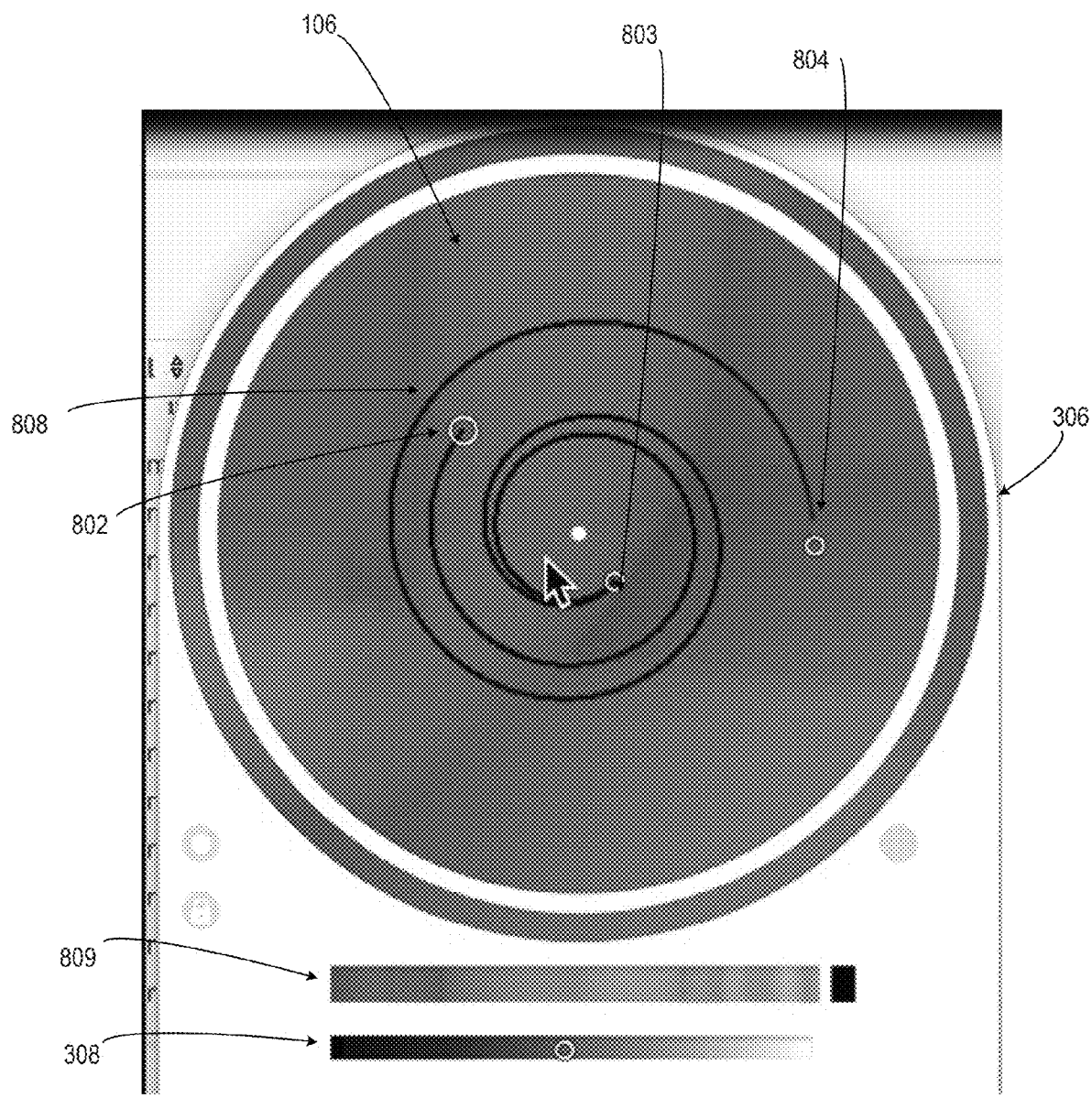
FIG. 8 depicts an example of generating a spiral-shaped, divergent color path through a color space element in the color-selection design interface of FIG. 3, according to certain embodiments of the present disclosure.

FIG. 8 depicts an example of generating a spiral-shaped, color map path through a color space element in the color-selection design interface of FIG. 3, according to certain embodiments of the present disclosure. The color-selection engine 102 has generated a color map path 808 between start point 802 and end point 804 including additional point 803 as described with regard to FIGS. 1 and 2. The color-selection design interface 103 displays the color map path 808 between the start point 802, the additional point 803, and end point 804 in color element 806. The color-selection engine 102 computes the color map path 808. The color-selection design interface 103 displays color gradient element 809 to represent the color map. In this example, the color map path 808 becomes a spiral color map path passing through the same hue values multiple times. The color-selection engine 102 computes the color map path 808 such that the end point 804 is computed relative to the previous point. The color-selection engine 102 thus enables the color map path 808 to repeat hue values including this example that illustrates color map path 808 having three points (e.g., in some cases a color map having three points can be divergent). The color-selection engine 102 repeats the color map path 808 hue values by adjusting the chroma (i.e., decreasing the chroma moving inward towards the center of the color space element 806). The repetition of hue values in the color map path improves the capability of the color-selection engine 102 to show a larger set of unique colors by changing both hue and chroma as the color map path spirals inside the color wheel 106.

For instance, a color map path 808 repeats hues with constant chroma values could be used to pick a set of distinct colors for categorical data sets where the color gradient element 809 is optimized if all colors have the similar perceptual weight. In other words, the color gradient element 809 contains colors that are perceived equally by a user with no color being perceived as more important (i.e., by having a greater perceptual weight) than any of the other colors of color gradient element 809. In other cases, a color map path 808 that repeats with a variation in chroma (e.g., an inward or outward spiral) could be used to pick a set of colors for categorical data that also has some weighting factor within the category (i.e., how strongly a data point fits into a specific category).

Figure 9:
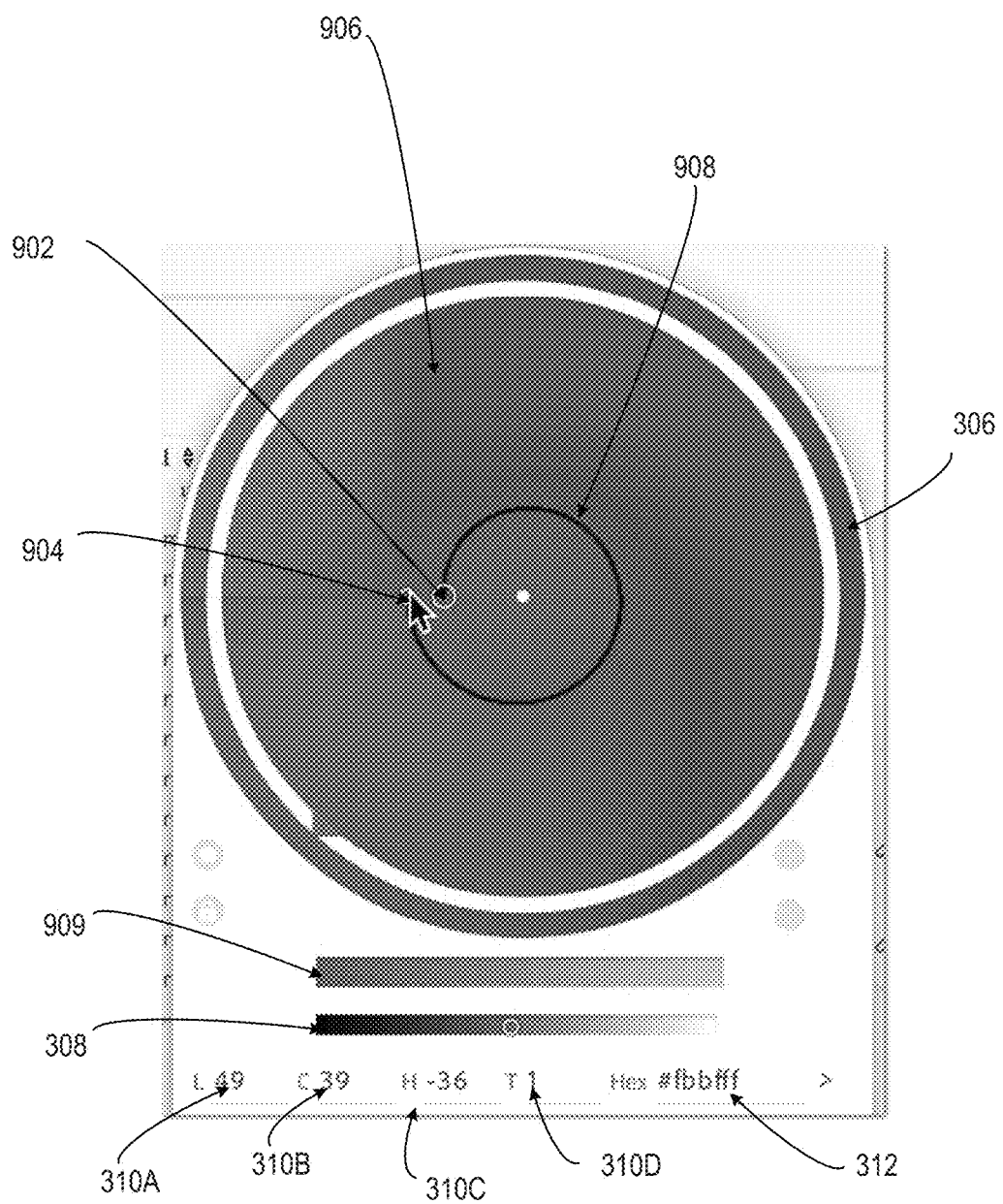
FIG. 9 depicts an example of generating a color path through a color space element using a constrained gamut represented in a color-selection design interface, according to certain embodiments of the present disclosure.

FIG. 9 depicts an example of generating a color path through a color space element using a reduced hue range represented in a color-selection design interface, according to certain embodiments of the present disclosure. In this example, a set of hue values have been removed from the spectrum ring 306 and color space element 106 has been remapped to only include the remaining hue values in hue mask 906. The color-selection engine 102 has generated a color map path 908 between start point 902 and end point 904 as described with regard to FIGS. 1 and 2. The color-selection design interface 103 displays the color map path 908 between the start point 902 and end point 904 in hue mask 906. The color-selection engine 102 computes a color gradient along the color map path 908. The color-selection design interface 103 displays color gradient element 909 to represent the color gradient.

In an embodiment, the color-selection engine 102 presents, in the color-selection design interface 103, one or more interface elements that visually depict a subset of the gamut (e.g., a portion of the total gamut). For example, a subset of the color space element 106 can be represented as a hue mask 906. The color-selection engine 102 determines a subset of the gamut to be displayed in the color-selection design interface 103. In some cases, the color-selection engine 102 determines the subset of the color space element 106 assigned to hue mask 906 in response to inputs received by the color-selection design interface 103 such as a range of hue values that lie in a segment of the hue values between 0° and 360° The hue mask 906 contains hues from a portion of the color space element 106. For instance 906 shows hues in a continuous range between from 330°-360° connected to a range 0°-123° effectively removing (masking) the hue values between 123°-330°. The hue mask 906 represents only a subset of hues in the spectrum ring 306. The color-selection engine 102 computes the color map path 908 between the start point 902 and the end point 904 within the hue mask 906. The color-selection engine 102 limits the hue mask to a portion of the total gamut (hue range 0-360°). The color-selection engine 102 is thus able to provide more precise computation of the color map path 908 within the subset of colors (e.g., allowing a more refined selection of hue and chroma).

Example of a Computing System for Implementing Certain Embodiments

Figure 10:
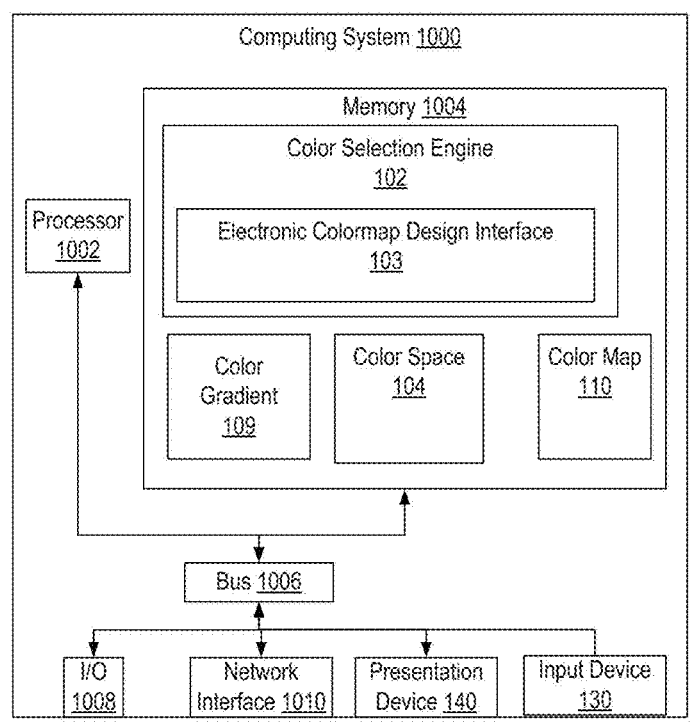
FIG. 10 depicts an example of a computing system for implementing certain embodiments of the present disclosure.

Any suitable computing system or group of computing systems can be used for performing the operations described herein. For example, FIG. 10 depicts an example of the computing system 1000. The implementation of computing system 1000 could be used for one or more of a color-selection engine 102 and a color-selection design interface 103. In other embodiments, a single computing system 1000 having devices similar to those depicted in FIG. 10 (e.g., a processor, a memory, etc.) combines the one or more operations and data stores depicted as separate systems in FIG. 1.

The depicted example of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

A memory device 1004 includes any suitable non-transitory computer-readable medium for storing color-selection engine 102, color-selection design interface 103, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, an input device 130, a presentation device 140, or other input or output devices. For example, the computing environment 100 is shown with one or more input/output ("I/O") interfaces 1008. An I/O interface 1008 can receive input from input devices or provide output to output devices. One or more buses 1006 are also included in the computing system 1000. The bus 1006 communicatively couples one or more components of a respective one of the computing system 1000.

The computing system 1000 executes color-selection engine 102 that configures the processor 1002 to perform one or more of the operations described herein. Examples of the color-selection engine 102 include, in various embodiments, color-selection design interface 103, or other suitable applications that perform one or more operations described herein (e.g., one or more development applications for generation of the color space 104, the color space element 106, etc.). The program code may be resident in the memory device 1004 or any suitable computer-readable medium and may be executed by the processor 1002 or any other suitable processor.

In some embodiments, one or more memory devices 1004 stores program data such as parameters and settings for the color space 104, color gradient 109, color map 110, or both. In additional or alternative embodiments, one or more of the programs, images, modules, and functions described herein are stored in different memory devices 1004 accessible via a data network.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., a computing device executing an color-selection engine 102) via a data network using the network interface device 1010.

In some embodiments, the computing system 1000 also includes the input device 130 and the presentation device 140 depicted in FIG. 10. An input device 130 can include any device or group of devices suitable for receiving visual, auditory, or other suitable input that controls or affects the operations of the processor 1002. Non-limiting examples of the input device 130 include a touchscreen, a mouse, a keyboard, a microphone, a separate mobile computing device, etc. A presentation device 140 can include any device or group of devices suitable for providing visual, auditory, or other suitable sensory output. Non-limiting examples of the presentation device 140 include a touchscreen, a monitor, a speaker, a separate mobile computing device, etc.

Although FIG. 10 depicts the input device 130 and the presentation device 140 as being local to the computing device that executes the color-selection engine 102, other implementations are possible. For instance, in some embodiments, one or more of the input device 130 and the presentation device 140 can include a remote client-computing device that communicates with the computing system 1000 via the network interface device 1010 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising, by one or more computing devices:
    displaying, in a color-selection design interface, a color space element that visually represents a color space available to a computing device or application;
    receiving, in the color-selection design interface, a user input identifying a start point of a color map path and an end point of the color map path;
    calculating paths between the start point and the end point in the color space element;
    constraining the calculated paths by at least removing one or more of the paths that do not traverse color representations comprising uniform transitions between one or more of lightness, chroma, and hue;
    selecting, from the constrained calculated paths, the color map path;
    drawing the color map path within the color space element between the start point and the end point;
    selecting, from the color space, a color gradient having a first color corresponding to the start point of the color map path within the color space element, a second color corresponding to the end point of the color map path within the color space element, and additional colors corresponding to additional points along the color map path within the color space element, wherein the color gradient traverses color representations comprising uniform transitions between the one or more of lightness, chroma, and hue;
    generating, based on the color gradient, a color map for visually representing target data values by at least mapping the first color to a minimum data value for a range of data values, the second color to a maximum data value for the range of data values, and the additional colors, respectively, to data values indicated by the range of data values; and
    providing the color map to the computing device or application.

2. The method of claim 1, wherein the color map path comprises a linear interpolation between the start point of the color map path and the end point of the color map path.

3. The method of claim 1, wherein the range of data values is a normalized range from a minimum data scale value of 0 to a maximum data scale value of 1, wherein the target data values are visually represented with the color map by (i) normalizing a minimum target value to the maximum data value of 1 and representing the minimum target value with the first color and (ii) normalizing a maximum target value to the maximum data value of 1 and representing the maximum target value with the second color.

4. The method of claim 1, wherein the selecting comprises:
    determining first color space values defining the first color from coordinates of a first color position within the color space element;
    computing a second color position within the color space element relative to the first color position;
    determining second color space values defining the second color from coordinates of the second color position within the color space element; and
    computing the additional points based on a specified quantity of step increments, wherein the additional points comprise a first additional point at a first additional color position, and a second additional point at a second additional color position, wherein the second additional color position is computed relative to the first additional color position, wherein the second color position is computed relative to the second additional color position, and wherein distances between the first color position, the first additional color position, the second additional color position and the second color position are determined by a length of the color map path and the specified quantity of step increments.

5. The method of claim 1, wherein the color space element comprises:
    a spectrum ring that visually represents available fully saturated hues;
    a gamut element that represents all available hues at a selected luminance value;
    a lightness selector, wherein a lightness of the gamut element is determined based on a position of the lightness selector;
    a set of color position indicators having values that describe positions of the first color, the second color, and the additional colors in the color space;
    a sequential selector state which specifies at least two color positions for adjusting the color map path between the start point and the end point;
    a divergent selector state which specifies at least three color positions for adjusting the color map path between the start point and the end point; and
    a color map path indicator that passes through all of the color position indicators of the set of color position indicators.

6. The method of claim 5, wherein the color map path adjusts to proceed in a perceptually uniform path from the start point to the end point when a sequential-divergent selector has a sequential mode selected.

7. The method of claim 5, wherein the color space element further comprises a gamut mask element within the color space element that limits the gamut element to a subset of hues available within a specified color space.

8. The method of claim 5, wherein the color map path is adjusted to pass through a neutral color within the color space element between the start point and the end point when a sequential-divergent selector has a divergent mode selected.

9. The method of claim 8, wherein drawing the color map path within the color space element comprises:
  determining a curvilinear path from the start point to the end point; and
  computing an updated curvilinear path based on receiving one or more additional inputs, wherein the one or more additional inputs comprises the sequential-divergent selector, the lightness selector, or indications of new positions for the start point or the end point.

10. A system comprising:
  one or more processing devices; and
  a non-transitory computer-readable medium communicatively coupled to the one or more processing devices and storing instructions, wherein the one or more processing devices are configured to execute the instructions and thereby perform operations comprising:
    displaying, in a color-selection design interface, a color space element that visually represents a color space available to a computing device or application;
    receiving, in the color-selection design interface, a user input identifying a start point of a color map path and an end point of a color map path;
    calculating paths between the start point and the end point in the color space element;
    constraining the calculated paths by at least removing one or more of the paths that do not traverse color representations comprising uniform transitions between one or more of lightness, chroma, and hue;
    selecting, from the constrained calculated paths, a color map path;
    drawing the color map path within the color space element between the start point and the end point;
    selecting, from the color space, a color gradient having a first color corresponding to the start point of the color map path within the color space element, a second color corresponding to the end point of the color map path within the color space element, and additional colors corresponding to additional points along the color map path within the color space element, wherein the color gradient traverses color representations comprising uniform transitions between the one or more of lightness, chroma, and hue, and wherein the color gradient is usable for generating a color map for visually representing target data values by associating (i) the first color with a minimum data value indicated by a range of data values, (ii) the second color with a maximum data value indicated by the range of data values, and (iii) the additional colors with respective additional values indicated by the range of data values.

11. The system of claim 10, wherein the color map path comprises a linear interpolation between the start point of the color map path and the end point of the color map path.

12. The system of claim 10, the operations further comprising:
  generating the color map, wherein generating the color map comprises:
    adding, to the color map, data that associates the first color with the minimum data value; and
    adding, to the color map, data that associates the second color with the maximum data value, herein the additional colors are respectively mapped to additional data values indicated by the range of data values; and
  providing the color map to the computing device or application.

13. The system of claim 10, wherein the selecting comprises:
  determining first color space values defining the first color from coordinates of a first color position within the color space element;
  computing a second color position within the color space element relative to the first color position;
  determining second color space values defining the second color from coordinates of the second color position within the color space element; and
  computing the additional points based on a specified quantity of step increments, wherein the additional points comprise a first additional point at a first additional color position, and a second additional point at a second additional color position, wherein the second additional color position is computed relative to the first additional color position, wherein the second color position is computed relative to the second additional color position, and wherein distances between the first color position, the first additional color position, the second additional color position and the second color position are determined by a length of the color map path and the specified quantity of step increments.

14. A non-transitory computer-readable medium having program code that is stored thereon, the program code executable by one or more processing devices for performing operations comprising:
  displaying, in a color-selection design interface, a color space element that visually represents a color space available to a computing device or application;
  receiving, in the color-selection design interface, a user input identifying a start point of a color map path and an end point of the color map path;
  calculating paths between the start point and the end point in the color space element;
  constraining the calculated paths by at least removing one or more of the paths that do not traverse color representations comprising uniform transitions between one or more of lightness, chroma, and hue;
  selecting, from the constrained calculated paths, a color map path;
  drawing the color map path within the color space element between the start point and the end point;
  selecting, from the color space, a color gradient having a first color corresponding to the start point of the color map path within the color space element, a second color corresponding to the end point of the color map path within the color space element, and additional colors corresponding to additional points along the color map path within the color space element, wherein the color gradient traverses color representations comprising uniform transitions between the one or more of lightness, chroma, and hue, wherein the color gradient is usable for generating a color map.

15. The non-transitory computer-readable medium of claim 14, wherein the selecting comprises:

determining first color space values defining the first color from coordinates of a first color position within the color space element;

computing a second color position within the color space element relative to the first color position;

determining second color space values defining the second color from coordinates of the second color position within the color space element; and computing the additional points based on a specified quantity of step increments, wherein the additional points comprise a first additional point at a first additional color position, and a second additional point at a second additional color position, wherein the second additional color position is computed relative to the first additional color position, wherein the second color position is computed relative to the second additional color position, and wherein distances between the first color position, the first additional color position, the second additional color position and the second color position are determined by a length of the color map path and the specified quantity of step increments.

16. The non-transitory computer-readable medium of claim 14, wherein the color space element comprises:

a spectrum ring that visually represents available hues;

a gamut element that represents all available colors at a selected lightness value;

a lightness selector, wherein a lightness of the gamut element is determined based on a position of the lightness selector;

a set of color position indicators having values that describe positions of the first color, the second color, and additional colors in the color space; and a sequential-divergent selector for adjusting the color map path between the start point and the end point.

17. The non-transitory computer-readable medium of claim 16, wherein drawing the color map path within the color space element comprises:

determining a curvilinear path from the start point to the end point; and computing an updated curvilinear path based on receiving one or more additional inputs, wherein the one or more additional inputs comprises the sequential-divergent selector, the lightness selector, or indications of new positions for the start point or the end point.

18. The non-transitory computer-readable medium of claim 14, wherein the color map path adjusts to proceed in a perceptually uniform path from the start point to the end point when a sequential-divergent selector has a sequential mode selected.

19. The non-transitory computer-readable medium of claim 14, wherein the color space element further comprises a gamut mask element within the color space element that limits the gamut element to a subset of colors available within a specified color space.

20. The non-transitory computer-readable medium of claim 14, wherein the color map path is adjusted to pass through a neutral color within the color space element between the start point and the end point when a sequential-divergent selector has a divergent mode selected.

* * * * *